Patented Dec. 17, 1940

2,225,155

UNITED STATES PATENT OFFICE 2,225,155

PREPARATION OF AMINO COMPOUNDS

Nicholas D. Cheronis, Chicago, Ill.

No Drawing. Application September 9, 1937
Serial No. 163,033

9 Claims. (Cl. 260—534)

My invention is concerned with novel processes for the production of glycine.

While various methods for the preparation of glycine are known, one very common and commercially practiced method involves the replacement of halogen in halogeno-acetic acids by amino groups as, for example, through the reaction of chloracetic acid with anhydrous or aqueous ammonia or alcoholic-aqueous solutions of ammonia. An important disadvantage of this type of process is that, in general, the reaction with ammonia does not run smoothly in that not only is the desired glycine compound produced but also secondary and tertiary amino compounds are formed so that, in the event that one is desirous of producing glycine, one is faced with the difficulty and expense of separating the glycine from the undesired other reaction products.

It has, heretofore, been recognized that, in order to obtain high yields of glycine, a large excess of ammonia must be used in the reaction. Thus, for example, in preparing glycine or alpha-amino acetic acid by reacting ammonium hydroxide and chloracetic acid at room temperatures, it was found necessary, in order to obtain proper yields of alpha-amino acetic acid, to employ about sixty (60) mols of ammonia in the form of ammonium hydroxide to one (1) mol of chloracetic acid. The use of molal ratios less than this has proven not to be commercially feasible since the yields of alpha-amino acetic acid are quite small. One disadvantage of such processes is manifest and that is that the volume of the reaction mass is very large and it is accordingly necessary to evaporate a large amount of water before precipitation of the alpha-amino acetic acid by means of methyl alcohol or the like becomes commercially feasible. The expense attendant upon eliminating such large volumes of water and the time required therefor make it apparent that there is much to be desired by way of improvement in this known procedure.

It is also generally known that the equilibrium resulting in formation of the glycine is favored by carrying out the ammonolysis reaction with ammonia at low temperatures. Thus, for example, in the reaction described above between chloracetic acid and aqueous ammonia or ammonium hydroxide, the molal ratio of the chloracetic acid to $NH_3$ being 1 to 60, the yield of glycine is 86% of the theoretical when the reaction is carried out at 25 degrees C. whereas the yield is only 41% to 42% of the theoretical when the reaction is carried out at 60 degrees C.

I have evolved a novel process for the preparation of glycine from halogeno-acetic acids whereby various of the disadvantages of the prior art are successfully overcome.

In general, my novel process involves reacting a halogeno-acetic acid with a system containing carbon dioxide and ammonia as exemplified in the employment of salts of ammonia which are capable of liberating carbon dioxide. The reaction is carried out preferably at elevated temperatures, and, in the embodiment where an ammonium salt as such is employed, the ammonium salt is utilized in the form of a strong, concentrated, saturated or substantially saturated aqueous, monohydric alcoholic, or aqueous-monohydric alcoholic, such as a water-ethyl alcohol, solution. Carbon dioxide and ammonia form a series of unstable salts, namely, ammonium bicarbonate ($NH_4HCO_3$), ammonium carbamate ($NH_4O.CONH_2$), and ammonium carbonate which is a mixture of the bicarbonate and carbamate ($NH_4O.CO.OH$).($NH_4O.CO.NH_2$). The proportions of the various salts formed depends upon conditions, in non-aqueous, such as alcoholic, media the carbamate predominating whereas, in aqueous media in very dilute solution, the bicarbonate predominates.

The practice of my invention results in several important advantages. In the first place, the ammonolysis takes place relatively rapidly and conversion to the glycine is more complete; secondly, higher reaction temperatures may be employed while still favoring primary amino formation; and thirdly, it is possible and advantageous to operate with much smaller volumes of materials. All of the above result in important economies of operation.

As I have indicated hereinabove, I react a halogeno-acetic acid, such as chloracetic acid, bromacetic acid or iodoacetic acid, with a relatively strong or concentrated solution of an ammonium salt which is capable of liberating carbon dioxide or with a solution containing a strong concentration of ammonia and carbon dioxide.

Among the ammonium salts which are capable of liberating ammonia and whose strong or substantially concentrated aqueous solutions I employ in the reaction are particularly ammonium carbonate, ammonium bicarbonate, ammonium carbamate, and mixtures thereof. For purposes of economy and for other reasons, I prefer to employ commercial ammonium carbonate.

The temperature at which the reaction is carried out and the length of time required for completion or substantial completion of the reaction are subject to some variation, being obviously dependent upon the specific compounds reacted and the degree of pressure employed, that is, whether the reaction is carried out at atmospheric, sub-atmospheric or super-atmospheric pressure, as well as upon the particular results desired. In general, the employment of super-atmospheric pressures and higher temperatures hastens the reaction but it by no means follows that the use of elevated temperatures and pressures is advisable in all or even a majority of cases since, in many cases, greater economy of operation results simply from carrying out the reaction at atmospheric pressure or very slightly above atmospheric pressure and at relatively low temperatures. Thus, for example, in producing alpha-amino acetic acid by reacting chloracetic acid with a saturated solution of ammonium carbonate, good results are obtained by carrying out the reaction at 50 degrees C. at atmospheric pressure. However, improved results, particularly by way of better yields, are obtained at a temperature range of 60 degrees C. to 65 degrees C. and at a pressure of about one to five pounds per square inch in excess of atmospheric pressure. Again, as a general rule, it should be noted that the bromo- and iodocompounds react much more rapidly than do the chloro- compounds. For example, the reaction of bromacetic acid or iodo-acetic acid with a substantially saturated aqueous solution of ammonium carbonate or ammonium bicarbonate or ammonium carbamate proceeds considerably more rapidly than if chloracetic acid is employed and with good yields of alpha-amino acetic acid. However, from an economic standpoint, the use of chloracetic acid is preferable since it is considerably less expensive than the bromo- or iodocompounds. Everything considered, I have found temperatures of about 50 degrees C. to 100 degrees C. to be quite satisfactory for producing the glycine with 60 degrees C. representing, in general, close to the optimum.

The exact mechanism of the reaction which takes place in accordance with my invention has not fully been ascertained and, while certain conclusions appear to be properly derivable from particular observed facts, I prefer to base my views on irrefutable facts rather than upon theoretical considerations. At any rate, I have found that, in particular comparative reactions which I have carried out, considering the ammonium carbonate reaction as a standard, the ammonium bicarbonate reacts somewhat slower and the yield is about 5% less, whereas, the ammonium carbamate acts more rapidly and the yield is approximately the same. In general, considering present costs of commercial reagents, my process can, in general, be more economically practiced when ammonium carbonate, preferably commercial ammonium carbonate, is utilized.

As I have indicated above, the practice of my process permits the employment of molal ratios of reacting ingredients substantially less than the prior art has found to be required in those cases wherein ammonia or ammonium hydroxide is employed. Thus, for example, as indicated above, while it has heretofore been necessary to employ about 60 mols of ammonia, in the form of ammonium hydroxide, for each mol of chloracetic acid in the preparation of glycine or alpha-amino acetic acid in order to obtain proper yields, I have found that the utilization of approximately 8 mols of $NH_3$, in the form of ammonium carbonate, for each mol of chloracetic acid or the like in the reaction, gives me excellent results, this being close to the optimum ratio for this particular reaction. In general, in this particular reaction and in similar reactions I may also use as high as about 20 mols of $NH_3$ and even higher, in the form of ammonium carbonate or the like, but the lower molal ratios falling between 3 and 20, per mol of chloracetic acid or the like are, in general, preferred. The contrast between this optimum molal ratio of 1 to 8 and the prior art practice of molal ratios of 1 to 60 and the advantages emanating from the ability to utilize such relatively smaller ratios of reacting material are manifest. It will be appreciated, however, that the molal ratios of the reactants are subject to some variation and this is particularly the case where the reactants are different. Those skilled in the art will, however, be able to select optimum or substantially optimum molal ratios of reactants in the light of my teachings herein.

In order that those skilled in the art may appreciate even more fully the advantages of my invention, I set forth hereinbelow various specific examples of how my invention may be practiced. It will be understood, however, that these examples are simply illustrative and are not to be construed as in any way limitative of my invention. Thus, for example, the temperatures and length of time of the reaction and the molal ratios of the reacting constituents are subject to variation, depending upon the particular nature of the reacting constituents, whether or not the reaction is carried out under super-atmospheric pressure and the degree thereof, the particular nature of the results desired, and other conditions.

EXAMPLE I.—*Glycine (alpha-amino acetic acid)*

A substantially concentrated aqueous solution, made up with 500 grams of monochloracetic acid, 2200 grams of commercial ammonium carbonate, and 1000 cc. water, was heated to about 58 degrees C. and maintained at about 58 degrees C. to 60 degrees C. for several hours, stirring being optional. The reaction was completed in three hours but it was found desirable, from the standpoint of increasing the yield of the glycine, to hold the reaction mass at the indicated temperatures for from 12 to 24 hours. The temperature was then gradually raised to 110 degrees C. in order to decompose the unreacted ammonium carbonate, and the volume was reduced to between 1100 cc. and 1200 cc. The reaction mixture was then cooled to 70 degrees C. and between 3500 cc. and 5000 cc. of methanol were added, with stirring, whereupon the glycine precipitated out, the relatively small amounts of secondary and tertiary amino compounds which were formed in the reaction remaining in solution. The yield was 260 grams which contained 247 grams of pure glycine or 62% of the theoretical amount. From the filtrate, between 10% and 12% more glycine can, if desired, be recovered, in which case the yield would be about 72%.

EXAMPLE II.—*Glycine*

1 mol of chloracetic acid was mixed with 4 mols of anhydrous ammonia and 1 mol of carbon dioxide (the carbon dioxide gas being previously passed into the anhydrous ammonia) and reacted for 8 hours at 40 degrees C. in an autoclave. The yield of glycine was 60% of the theoretical.

By doubling the amounts of each of the anhydrous ammonia and the carbon dioxide and heating in an autoclave at 60 degrees C. for 6 hours, the yield of glycine was raised to 71% of the theoretical.

The unusual effect of the presence of carbon dioxide in the system is at once evident by considering the results obtained as evidenced by the following table:

| Halogen compound, mols | Anhydrous ammonia, mols | Temp., degrees C. | Time of reaction, hours | Extent to which reaction goes to completion, percent | Yield of primary amine percent of theoretical |
|---|---|---|---|---|---|
| 1 | 4 | 40 | 8 | 98.8 | 21 |
| 1 | 8 | 40 | 8 | 98.6 | 27 |
| 1 | 60 | 60 | 6 | 99.2 | 42 |
| 1 | 110 | 60 | 6 | 99.5 | 58 |
| 1 | 4 mols anhydrous NH$_3$ and 1 mol CO$_2$ | 40 | 8 | 99.0 | 60 |
| 1 | 8 mols anhydrous NH$_3$ and 2 mols CO$_2$ | 60 | 6 | 100.0 | 71 |

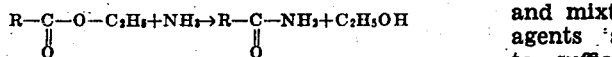

I have previously stated that I may operate my process at super-atmospheric pressures. In general, the use of such pressures hastens the reaction but does not materially increase the yield, if at all, and possesses the disadvantage of producing hydroxy compounds as side reactions. Thus, for example, I have produced glycine by heating the reacting constituents of Example I, in the proportions there set forth, to between 60 degrees C. and 70 degrees C. in an autoclave for six hours, a gauge pressure of 50 pounds to 100 pounds per square inch being developed therein. (The autoclave is provided with a suitable valve to release any excess pressure due to uncombined carbon dioxide when the autoclave is cooled.) The yield was the same as in Example I.

It will be understood, from a consideration of the description of my invention as pointed out hereinabove, that as the reaction of the halogeno-acetic acid with the ammonium carbonate or the like proceeds, ammonia is used up in the formation of the glycine. The result is to leave an excess of carbon dioxide in the reaction mass so that, as the reaction proceeds, both ammonia and ammonium carbonate are present during the ammonolysis. If desired, however, from 20% to 30% less ammonium carbonate may be used and the corresponding amount of ammonium hydroxide used in its stead. By so proceeding, higher yields are obtained than in the case where ammonium carbonate is used alone as the ammonolysis reagent. In this connection, as indicated hereinabove, it will be understood that an aqueous solution of ammonium carbonate contains ammonium hydroxide due to hydrolysis so that the use of ammonium hydroxide together with ammonium carbonate may be considered as resulting in a shift to one of the various equilibria indicated by the following equations:

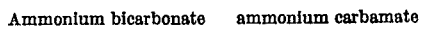
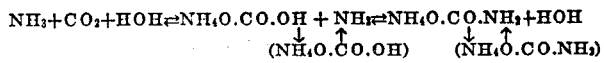
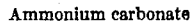

This application is a continuation-in-part of my earlier application, Serial No. 96,315, filed August 15, 1936, which, in turn, was a continuation-in-part of an earlier application, Serial No. 37,949, filed August 26, 1935.

I claim:

1. The process of producing alpha-amino acetic acid from chloracetic acid which comprises reacting chloracetic acid with a substantially saturated aqueous solution of a salt selected from the group consisting of ammonium carbonate, ammonium bicarbonate, ammonium carbamate and mixtures thereof, as the sole ammonolysis agents and heating the reaction mixture to sufficiently high temperature and for a length of time sufficient to substantially complete the reaction and form the alpha-amino acetic acid.

2. The process of claim 1 wherein the molal ratio of the NH$_3$, present in the ammonium salt, to the chloracetic acid is about 8 to 1 and not more than 20 to 1.

3. The process of producing alpha-amino acetic acid from halogeno-acetic acid which comprises reacting said halogeno-acetic acid with a substantially saturated aqueous solution of a salt selected from the group consisting of ammonium carbonate, ammonium bicarbonate, ammonium carbamate, and mixtures thereof, the reaction being carried out at a temperature approximately of the order of 55 degrees C. to 65 degrees C., and for a length of time sufficient to substantially complete the reaction and form the alpha-amino acetic acid.

4. The process of producing alpha-amino acetic acid from chloracetic acid which comprises reacting chloracetic acid with a substantially saturated aqueous solution of a salt selected from the group consisting of ammonium carbonate, ammonium bicarbonate, ammonium carbamate, and mixtures thereof, the reaction being carried out at a temperature approximately of the order of 55 degrees C. to 65 degrees C. for a length of time sufficient to complete the reaction and form the alpha-aminoacetic acid.

5. The process of claim 4, wherein the molal ratio of the NH$_3$, present in the ammonium salt, to the chloracetic acid is about 8 to 1 and not more than 20 to 1.

6. The process of producing alpha-amino acetic acid from halogeno-acetic acid which comprises reacting said halogeno-acetic acid with a substantially saturated aqueous solution of a salt selected from the group consisting of ammonium carbonate, ammonium bicarbonate, ammonium carbamate, and mixtures thereof, as the sole ammonolysis agents, and heating the reaction mixture to a sufficiently high temperature and for a length of time sufficient to substantially complete the reaction and form the alpha-amino acetic acid.

7. The process of producing alpha-amino acetic acid which comprises reacting a halogeno-acetic acid with a strong aqueous solution of ammonia and a salt selected from the group consisting of ammonium carbonate, ammonium bicarbonate, ammonium carbamate, and mixtures thereof, the reaction being carried out at a temperature between 50° C. and 70° C. and for a length of time sufficient to substantially complete the reaction, the reaction being carried out at a pressure not substantially exceeding atmospheric, the molal ratio of the ammonia, including that present as ammonium carbonate, ammonium bicarbonate and ammonium carbamate, to the halogeno-acetic acid falling within the range of about 3 to 1 and about 20 to 1.

8. In a process for the preparation of glycine by ammonolysis of chloracetic acid, the step which consists in heating said acid at a temperature between 50 degrees C. and 65 degrees C. and at subtsantially atmospheric pressure with an aqueous solution containing a high concentration of ammonia and ammonium carbonate, the molal ratio of the ammonia, including that present as ammonium carbonate, to the chloracetic acid falling within the range of 3 to 1 and 20 to 1.

9. The process of producing glycine from a halogeno-acetic acid which comprises reacting said halogeno-acetic acid with a concentrated aqueous solution of ammonia and a member selected from the group consisting of ammonium carbonate, ammonium bicarbonate, ammonium carbamate, and mixtures thereof, the reaction being carried out at a temperature of about 60 degrees C. to 65 degrees C. and at a pressure not substantially exceeding atmospheric, the molal ratio of the ammonia, including that present as ammonium carbonate, ammonium bicarbonate, and ammonium carbamate, to the halogeno-acetic acid falling within the range of 3 to 1 and 20 to 1.

NICHOLAS D. CHERONIS.